United States Patent [19]

Bambi

[11] Patent Number: 5,598,764
[45] Date of Patent: Feb. 4, 1997

[54] ESPRESSO COFFEE MACHINE FOR THE DIFFERENTIATED APPLICATION OF THE WATER PRESSURE AND FOR PREINFUSION IN THE DISPENSING GROUP

[75] Inventor: Piero Bambi, Florence, Italy

[73] Assignee: La Marzocco S.r.l., Florence, Italy

[21] Appl. No.: 503,551

[22] Filed: Jul. 18, 1995

[30] Foreign Application Priority Data

Jul. 18, 1994 [IT] Italy .................. FI94A0140

[51] Int. Cl.⁶ .................................. A47J 31/06
[52] U.S. Cl. .......................... 99/295; 99/302 R
[58] Field of Search ................. 99/279, 295, 299, 99/300, 302 R, 316, 280, 281, 282, 283, 287; 426/433

[56] References Cited

U.S. PATENT DOCUMENTS

| | | | |
|---|---|---|---|
| Re. 15,707 | 10/1923 | Simonton | 99/302 R |
| 2,881,692 | 4/1959 | Volcov | 99/302 R |
| 3,599,557 | 5/1970 | Leal | 99/295 |
| 3,824,914 | 7/1974 | Casiano | 99/300 |
| 4,757,753 | 7/1988 | Pandolfi | 99/302 R |

FOREIGN PATENT DOCUMENTS 1241768  8/1990  Italy .

*Primary Examiner*—Robert W. Jenkins
*Attorney, Agent, or Firm*—Birch, Stewart, Kolasch & Birch LLP

[57] ABSTRACT

The method involves preceding the infusion of the coffee with a stage in which the coffee powder is soaked (preinfused) with a gradual increase in the pressure. The improvement located on the delivery pipe of an espresso coffee machine, immediately upstream of the infusion group, is a pressure damping device. This allows improved imbibition by the coffee powder during the "infusion" stage, i.e. the stage that precedes the actual dispensing of the espresso coffee.

4 Claims, 1 Drawing Sheet

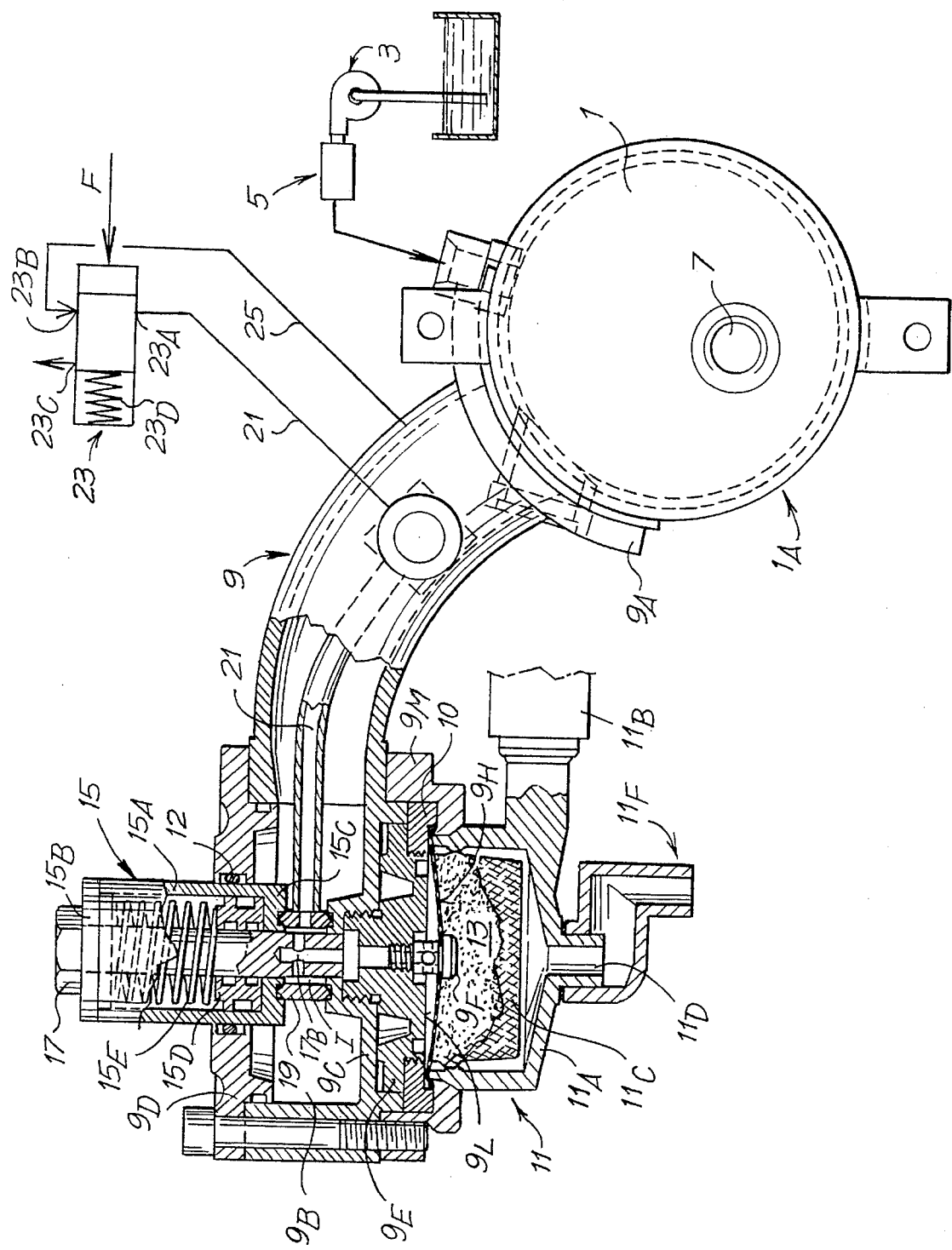

5,598,764

ESPRESSO COFFEE MACHINE FOR THE DIFFERENTIATED APPLICATION OF THE WATER PRESSURE AND FOR PREINFUSION IN THE DISPENSING GROUP

BACKGROUND OF THE INVENTION

When preparing espresso coffee, a measured amount of coffee, ground to a powder of appropriate particle size, is mechanically packed down to a suitable degree in an infusion and dispensing vessel into which water, which has been heated in a boiler, is fed under pressure. The pressure of the water is kept at a level which is sufficient to cause the formation of an emulsion ("cream") between the water which passes through the packed down coffee powder and the essential oils which pass from the coffee powder into the water. If this pressure level, which is usually between 8 and 9 bar, is applied abruptly to the coffee powder, it causes a further settling of the powder inside the vessel known as the "filter", with the result that the water follows preferential routes. This means that the powder is not used uniformly since it is not fully infused and this then leads to poor coffee yield.

SUMMARY OF THE INVENTION

In order to avoid this disadvantage, the first subject of the invention is a method for preparing espresso coffee in which, before the coffee is dispensed, the coffee powder is subjected to a preinfusion stage in which it is soaked with water at a reduced pressure, this pressure subsequently being increased to the optimum value so as to exploit the coffee powder to the fullest extent and produce the so-called coffee "cream". In this way there is improved imbibition by the coffee powder during the infusion stage, i.e. the stage that precedes the actual dispensing of the espresso coffee.

A further subject of the invention is an improvement to the espresso coffee machine which comprises a pump which feeds water to a boiler for heating the water, a delivery pipe with an optional calibrated throttling for drawing the water from the boiler and conveying it, via a three-way valve, to a group in which the coffee powder is infused and from which the coffee is dispensed. According to the invention, located on said delivery pipe and immediately upstream of the infusion group, is a pressure damping device which ensures that the boiler pressure is not applied abruptly to the coffee powder.

In particular, said damping device comprises a cylindrical chamber containing a piston which is stressed by a calibrated spring in order to cancel out the volume of said cylindrical chamber, so that, when the three-way valve is actuated in order to dispense the coffee, the water pressure in the infusion group gradually exceeds atmospheric pressure, and only when the chamber formed by the piston being lifted up has reached its maximum volume can the pressure in the infusion group reach the intended optimum value offered by the boiler feed pump in order to dispense the coffee and form the so-called coffee "cream".

The infusion group can form part of an arm which is heated by the natural circulation of the water from the boiler, in order to keep it hot and ready to dispense coffee even when a period of time has lapsed since the previous coffee was dispensed, thereby compensating for heat loss into the environment, and the outside of said cylindrical chamber can be at least partly surrounded by the water from the boiler which circulates naturally inside said arm, so that it also is kept hot, in the same way as the infusion group.

Further characteristic advantages and embodiments of the method and of the improvement to the coffee machine according to the invention are defined in the appended claims.

BRIEF DESCRIPTION OF THE DRAWINGS

The invention will be more clearly understood by following the description and the attached drawing which illustrates a practical nonlimiting embodiment of the invention. In the drawing:

The single FIGURE illustrates a partly diagrammatic view, in partial section through a vertical plane of symmetry, of a dispensing arm of an espresso coffee machine incorporating the improvement which forms the subject of the invention.

DETAILED DESCRIPTION OF THE PREFERRED EMBODIMENT

The espresso coffee machine comprises a small boiler 1 which is fed by a pump 3 via a nonreturn valve 5 and heated by an electrical resistance element 7. The boiler has a cylindrical shape and communicates with a hollow arm 9 which is mounted in a raised position by means of its flange 9A on the cylindrical shell 1A of the boiler. The water from the boiler fills the hollow arm and, by virtue of the latter's raised position, hot water is naturally caused to circulate within it by convection, in order to compensate for heat losses and keep the arm at approximately the same temperature as that of the water in the boiler.

The arm 9 is curved and terminates in a cylindrical chamber 9B with a vertical axis, this chamber having a base 9C with a hole in the middle and a cover 9D which is screwed on to a ring 9M. Clamped on to the underside of the base 9C by means of the ring 9A is a seal 10 and a cylindrical element 9E which has an axial hole and is coaxial with the chamber 9B. A finely perforated metallic disk 9H which cups slightly downward is connected to the underside of the cylindrical element 9E by means of a screw 9F, this screw 9F having holes which form a connection between the chamber 9B and the chamber 9L left between the top of the disk 9H and the bottom of the element 9E.

An infusion and dispensing group 11 can be attached to the bottom of the ring 9M by means of a bayonet connection (not shown) and comprises a cylindrical vessel 11A with a handle 11B and a filter 11C which is coaxial and in contact with the perforated disk 9H. The filter is filled with coffee powder 13 which, by means of the handle 11B and of the bayonet connection, is held between the filter 11C and the perforated disk 9H. The cylindrical vessel 11A has a central hole 11B at the bottom to which a coffee dispensing spout 11F is connected.

Passing through the cover 9D, with the insertion of a seal 12, is a damping device 15 which comprises a cylindrical body 15A which is coaxial with the chamber 9B and is delimited internally by a cylindrical surface defining a chamber 15F which is closed off by ends 15B, 15C and contains a piston 15D stressed downward by a spring 15E. The damping device is clamped on to the base 9C of the chamber 9B by means of a central screw 17 and with the insertion of the ring 19. Between the base 15C of the damping device, the ring 19 and the shank of the screw 17, a cavity I is left which connects with the chamber 9L above the perforated disk 9H through holes 17B made in the bottom part of the screw 17.

Connected to the ring 19 is a pipe 21 which forms a connection between the cavity and the delivery aperture 23A of a three-way valve 23. The movable member of the valve is stressed by a spring 23D in order to keep the delivery aperture 23A normally connected to the discharge aperture 23C of the valve. By actuating the movable member manually or by means of a solenoid in the direction of the arrow F, the delivery aperture 23A is connected to the feed aperture 23B of the valve, to which the water from the boiler 1 is conveyed via a pipe 25.

In the conditions illustrated in the drawing, the water in the boiler, heated by the resistance element 7, circulates by natural convection, thereby keeping the walls of the chamber 9B, the damping device 15 (the bottom of which is surrounded by the water) and the terminal part of the delivery pipe 21 hot. By actuating the three-way valve 23 in the direction of the arrow F, the water in the boiler is delivered by the pipe into the cavity I. The spring 15E is dimensioned such that the pressure with which the pump 3 feeds water to the boiler—distributed over the surface of the piston 15D—causes the latter to lift up until it compresses the spring as tight as it can go. During this stage, the pressure in the chamber 9L located above the filter containing the coffee rises gradually from atmospheric pressure to the value defined by the spring 15E, thereby enabling the water to soak right through all the coffee contained in the filter without following preferential routes. Only when the spring 15E is fully compressed can the pressure in the chamber 9L rise to the maximum value offered by the pump 3, so that the water passes through the coffee powder and produces the "cream".

It is understood that the drawing merely illustrates one example which is given only as a practical demonstration of the invention, it being possible for the invention to vary in form and arrangement without thereby departing from the scope of its underlying concept.

I claim:

1. An espresso coffee machine, comprising:
    a pump which feeds water to a boiler for heating the water;
    a delivery pipe for drawing the water from the boiler and conveying it, via a three-way valve, to an infusion group in which coffee powder is infused and from which coffee is dispensed; and
    a pressure damping device located on said delivery pipe upstream of the infusion group which ensures that a boiler pressure is not applied abruptly to the coffee powder.

2. The espresso coffee machine according to claim 1, wherein said pressure damping device comprises a cylindrical chamber containing a piston which is stressed by a calibrated spring in order to cancel out a volume of said cylindrical chamber, so that, when the three-way valve is actuated in order to dispense the coffee, the water pressure in the infusion group gradually exceeds atmospheric pressure, and only when the chamber formed by the piston being lifted up has reached its maximum volume can the pressure in the infusion group reach an optimum value offered by the pump in order to dispense the coffee and form the emulsion.

3. The espresso coffee machine according to claim 1, wherein the infusion group forms part of an arm which is heated by natural circulation of the water from the boiler, in order to keep the water hot and ready to dispense coffee even when a period of time has lapsed since a previous amount of coffee was dispensed, thereby compensating for heat loss into the environment.

4. The espresso coffee machine according to claim 1, wherein the outside of said cylindrical chamber is at least partly surrounded by the water from the boiler which circulates naturally inside said arm, and is housed in an optimum position to be kept hot, in the same way as the infusion group.

* * * * *